(12) United States Patent
Bodnar et al.

(10) Patent No.: US 6,619,951 B2
(45) Date of Patent: Sep. 16, 2003

(54) BURNER

(75) Inventors: Timothy J. Bodnar, Nashville, TN (US); David C. Baese, Antioch, TN (US); Mohsen Sarfehjoo, Brentwood, TN (US)

(73) Assignee: Lochinvar Corporation, Lebanon, TN (US)

( * ) Notice: Subject to any disclaimer, the term of this patent is extended or adjusted under 35 U.S.C. 154(b) by 0 days.

(21) Appl. No.: 09/753,016

(22) Filed: Jan. 2, 2001

(65) Prior Publication Data

US 2002/0092482 A1 Jul. 18, 2002

Related U.S. Application Data

(60) Provisional application No. 60/240,910, filed on Feb. 3, 2000, and provisional application No. 60/175,340, filed on Jan. 10, 2000.

(51) Int. Cl.⁷ .................... F23D 14/14; F23D 14/46
(52) U.S. Cl. .................. 431/329; 431/350; 122/18.1; 122/17.1
(58) Field of Search .................. 431/329, 328, 431/326, 343, 349, 346, 350, 114; 122/14.1, 14.2, 17.1, 18.1, 18.3; 165/901, 902

(56) References Cited

U.S. PATENT DOCUMENTS

| | | | |
|---|---|---|---|
| 2,780,206 A | 2/1957 | La Roque et al. | 122/448 |
| 3,574,504 A | 4/1971 | Breslin | 431/329 |
| 4,158,438 A | 6/1979 | Hapgood | 237/7 |
| 4,723,513 A | 2/1988 | Vallett et al. | 431/328 |
| 4,793,800 A | 12/1988 | Vallett et al. | 431/328 |
| 4,852,524 A | 8/1989 | Cohen | 122/448.1 |
| 5,165,887 A | 11/1992 | Ahmady | 431/329 |
| 5,240,411 A | 8/1993 | Abalos | 431/329 |
| 5,357,907 A | 10/1994 | Moore, Jr. et al. | 122/406.1 |
| 5,881,681 A | 3/1999 | Stuart | 122/18.31 |
| 6,065,963 A | 5/2000 | Dewaegheneire et al. | 431/329 |

OTHER PUBLICATIONS

European Patent No. 0 245 084.
PCT Application WO 98/30839.

*Primary Examiner*—Henry Bennett
*Assistant Examiner*—Josiah C. Cocks
(74) *Attorney, Agent, or Firm*—Waddey & Patterson; Lucian Wayne Beavers (57) ABSTRACT

A burner apparatus includes a mounting head having a fuel inlet opening defined in the mounting head for receiving combustion air and fuel gas through the opening. An inner support structure is attached to the mounting head. The inner support structure defines an interior zone communicated with the fuel inlet opening of the head. An exterior layer of flexible woven heat resistant material is received about the inner support structure and defines an exterior flame attachment surface. The mounting head may include a radial opening defined therethrough. An igniter is located outside of the mounting head adjacent the radial opening so that the igniter is proximally spaced from a combustion zone surround the burner apparatus. The burner apparatus may include a plurality of foraminous back pressure plates located in the interior zone distal of the igniter for balancing the pressure of the fuel gas/combustion air mixture along the length of the burner.

34 Claims, 5 Drawing Sheets

BURNER

This application claims benefit of our prior pending U.S. Provisional Patent Application Ser. No. 60/175,340, entitled "Water Heater With Continuously Variable Air and Fuel Input" by Baese, et al. filed Jan. 10, 2000, and of our prior pending U.S. Provisional Patent Application Ser. No. 60/240,910, entitled "Burner" filed Feb. 3, 2000. The details of those prior applications are incorporated herein by reference.

BACKGROUND OF THE INVENTION

1. Field of the Invention

The present invention relates generally to burners for use in water heaters and boilers, and more particularly to a burner constructed to provide a variable heat energy output without suffering from stress cracking of the burner surface.

2. Description of the Prior Art

One typical prior art burner construction is that shown in U.S. Pat. Nos. 4,723,513 and 4,793,800 to Vallett, et al., the details of which are incorporated herein by reference. Referring to FIG. 3 of Vallett, et al., U.S. Pat. No. 4,793,800, that burner construction includes an inner screen 86 having relatively small perforations 88, and a larger outer screen 92 having relatively large perforations 90. While such a burner construction is very adequate for use in a system which is constructed to operate at a substantially constant fuel gas and combustion air flow rate to the burner, such a system is not suitable for use with varying flow rates of combustion air and fuel gas to the burner.

Some other systems have included open flame burners, much like a Bunsen burner, for use with a water heater. Examples of such systems are those seen in U.S. Pat. No. 4,852,524 to Cohen and U.S. Pat. No. 5,881,681 to Stuart.

There is a continuing need in the art for improved burner constructions, and particularly for a burner construction arranged generally like that of Vallett, et al., U.S. Pat. No. 4,793,800, but constructed in a manner suitable for varying burner heat output rates.

SUMMARY OF THE INVENTION

A burner apparatus includes a mounting head having a fuel inlet opening defined in the head for receiving combustion air and fuel gas through the opening. An inner support structure is attached to the mounting head. The inner support structure defines an interior zone communicated with the fuel inlet opening of the head. An exterior layer of flexible woven heat resistant material is received about the inner support structure and defines an exterior flame attachment surface.

Such a burner may be utilized in a water heater including a variable rate fuel supply system for supplying pre-mixed combustion air and fuel gas to the burner apparatus at a variable flow rate within a flow rate range. A heat exchanger is operably associated with the burner apparatus so that heat energy from the burner apparatus is transferred to water flowing through the heat exchanger, with the heat transfer occurring at varying rates dependent upon the flow rate at which combustion air and fuel gas are supplied to the burner apparatus.

The burner apparatus will operate at these varying heat output rates, and due to its stress free surface provided by the flexible outer layer, there will be no heat induced stress cracking of the burner.

The mounting head may include a tubular neck having a radial opening defined therethrough. An igniter is located outside of the neck adjacent the radial opening so that the igniter is proximally spaced from a combustion zone surrounding the outer layer of flexible woven heat resistant material.

The burner apparatus may include a plurality of annular foraminous back pressure baffles to balance the flow of combustion air and fuel gas along the length of the burner apparatus.

It is therefore, an object of the present invention to provide an improved burner construction capable of operating at varying heat energy outputs without creating heat induced stress cracking of the surface of the burner.

Another object of the present invention is the provision of a burner construction having an igniter located outside of the combustion zone of the burner.

Another object of the present invention is the provision of a burner apparatus having a balanced flow of combustion air and fuel gas along the length of the burner apparatus.

Still another object of the present invention is the provision of a relatively quiet operating burner apparatus.

And another object of the present invention is the provision of methods of using such burner apparatus.

Other and further objects, features and advantages of the present invention will be readily apparent to those skilled in the art upon a reading of the following disclosure when taken in conjunction with accompanying drawings.

DETAILED DESCRIPTION OF THE PREFERRED EMBODIMENTS

Figure 1:
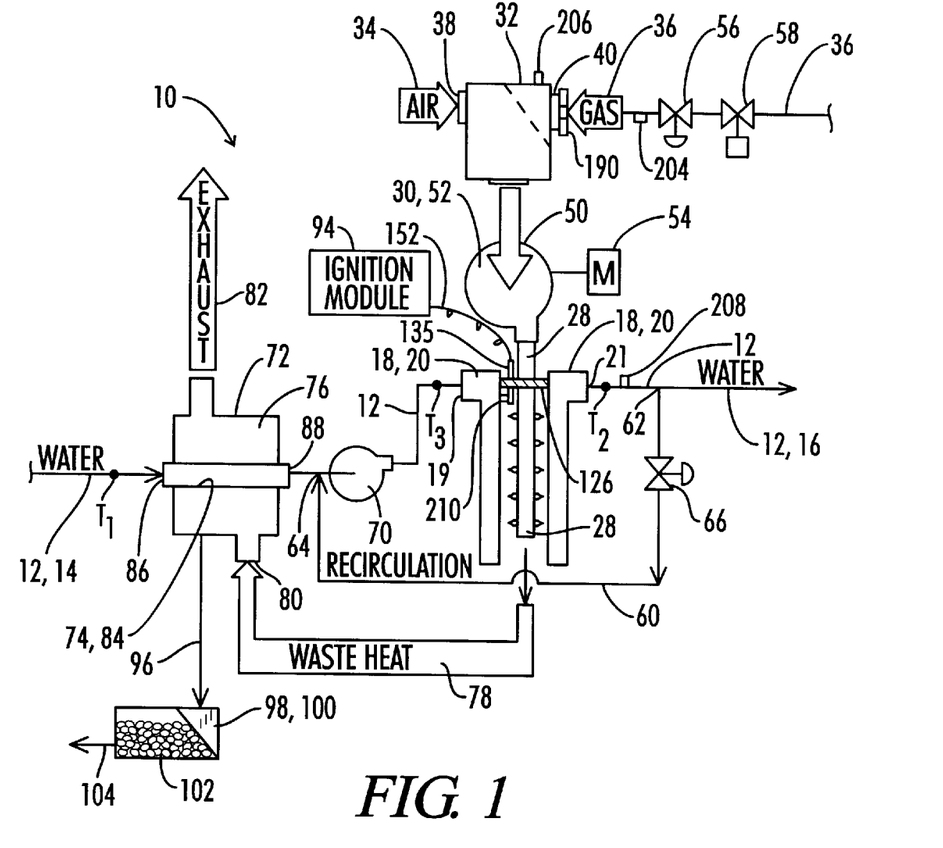
FIG. 1 is a schematic illustration of the water heater system of the present invention.

Referring now the drawings and particularly to FIG. 1, the water heater apparatus of the present invention is shown and generally designated by the numeral 10. The water heater apparatus 10 includes a water conduit 12 having an inlet 14 and an outlet 16.

The water heater apparatus 10 may be placed in a water supply loop to add heat to the water passing therethrough and that water may be circulated to a storage container and/or to locations of ultimate use. Thus, some of the inlet water to the water heater apparatus 10 may have been previously heated water which has returned and some of the inlet water may be ambient make up water.

A primary heat exchanger 18 has a water side 20 which defines a portion of the water conduit 12. The water side 20 of primary heat exchanger 18 includes an inlet 19 and an outlet 21.

Figure 3:
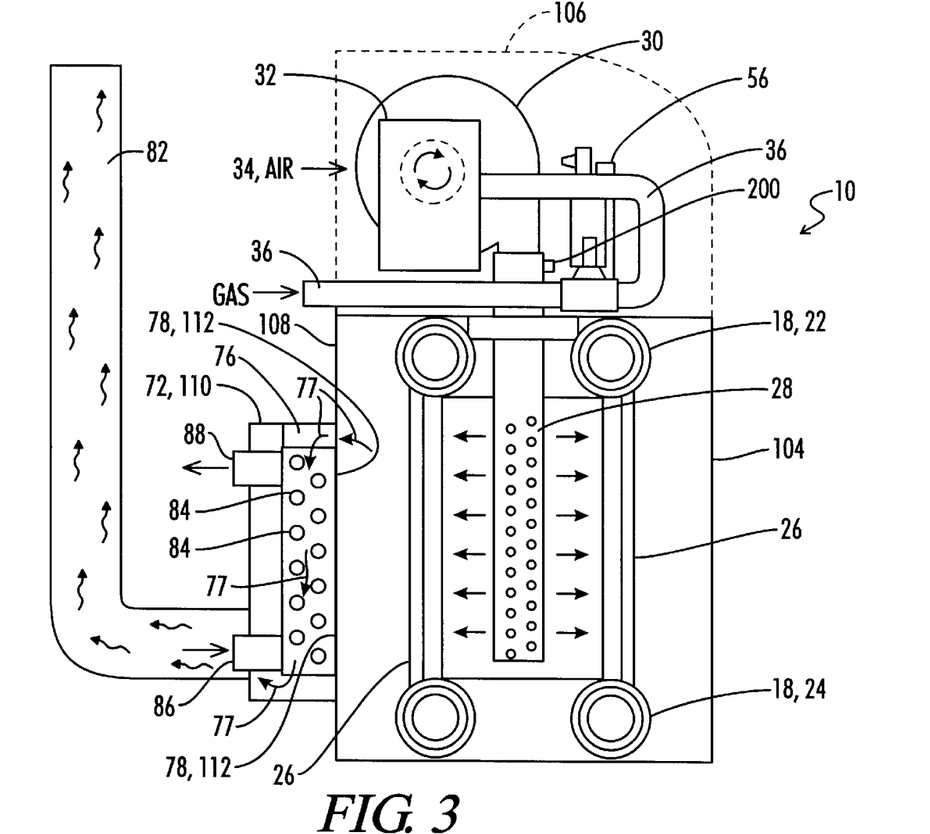
FIG. 3 is a schematic elevation sectioned view of the water heater system of FIG. 1.
Figure 4:
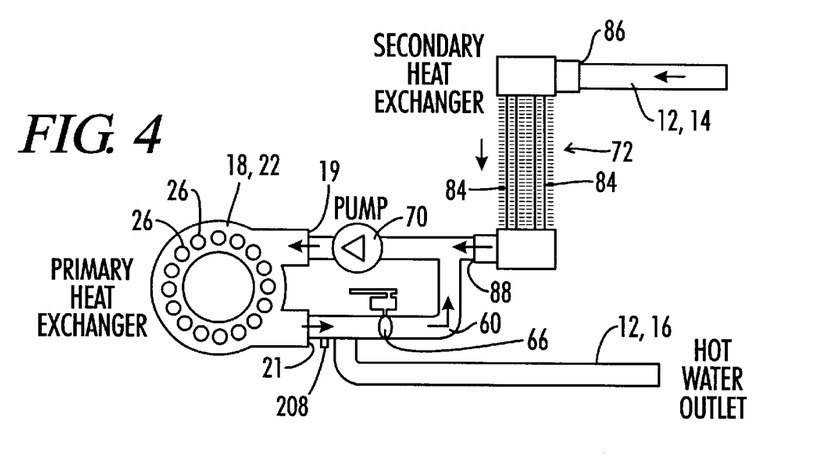
FIG. 4 is a schematic hydraulic diagram of the primary heat exchanger, secondary heat exchanger and recirculation system of the system of FIG. 1.

The general construction of the primary heat exchanger 18 is similar to that disclosed in U.S. Pat. No. 4,793,800 to Vallett et al., the details of which are incorporated herein by reference. As illustrated in FIGS. 2, 8 and 9 of Vallett et al., the primary heat exchanger is a multiple pass exchanger having a plurality of fin tubes arranged in a circular pattern, with a burner located concentrically within the circular pattern of fin tubes. This structure is schematically illustrated in FIGS. 3 and 4 of the present application wherein the primary heat exchanger 18 is shown to have upper and lower heads 22 and 24 connected by a plurality of vertically oriented fin tubes 26.

A burner 28 is concentrically received within the circular array of fin tubes 26 of the primary heat exchanger 18. The burner 28 can be described as being operatively associated with the primary heat exchanger 18 for heating water which is contained in the water side of the primary heat exchanger 18. It will be appreciated by those skilled in the art that the water flowing through water conduit 12 flows in a multitude of passes through the interior of the various fin tubes 26 between the upper and lower headers 22 and 24. Within each fin tube 26, the water receives heat from the burner 28 that is radiating directly upon the exterior fins of the fin tubes 26.

In order to provide the variable output operation of the burner 28, a variable flow blower 30 is provided in order to provide pre-mixed combustion air and fuel gas to the burner 18 at a controlled blower flow rate within a blower flow rate range.

The details of construction of the burner 18 are further shown in FIGS. 6–11. The burner 28 is of the type referred to as a pre-mix burner which burns a previously mixed mixture of combustion air and fuel gas.

In the system shown in FIG. 1, a transition chamber 32 is provided for mixing combustion air and fuel gas. An air supply duct 34 provides combustion air to the mixing chamber 32. A gas supply line 36 provides fuel gas to the transition chamber 32.

Figure 5:
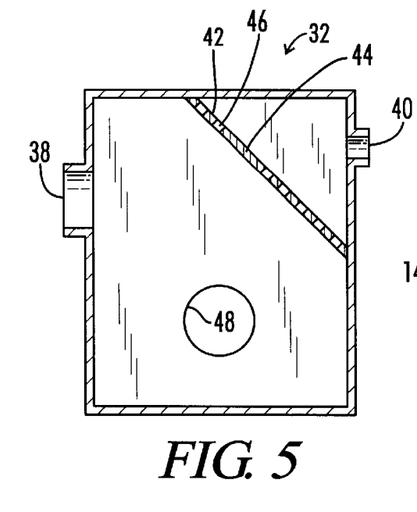
FIG. 5 is an elevation sectioned schematic view of a transition box for mixing combustion air and fuel gas upstream of the blower.

The details of construction of the transition chamber 32 are schematically illustrated in FIG. 5. The transition chamber 32 is a box shape structure having an air inlet 38 and a gas inlet 40 which are connected to the air supply duct 34 and gas line 36, respectively. A flow diffuser screen 42 is provided for breaking up the flow of the incoming gas stream so that it can be effectively, rapidly and thoroughly mixed with the incoming air stream. The diffuser screen 42 includes a solid area 44 immediately in front of the incoming gas stream. Diffuser screen 42 includes a plurality of openings 46 therein which allow incoming air to flow therethrough. The openings 46 make up from 30% to 50% of the area of screen 42. The air and gas mix within the transition chamber 42 and then flow out of a fuel/air outlet 48 into the inlet 50 of blower 30.

The air and fuel supply system is preferably constructed to provide in the range of 30% to 35% excess air above that required for combustion of the fuel gas.

Figure 14:
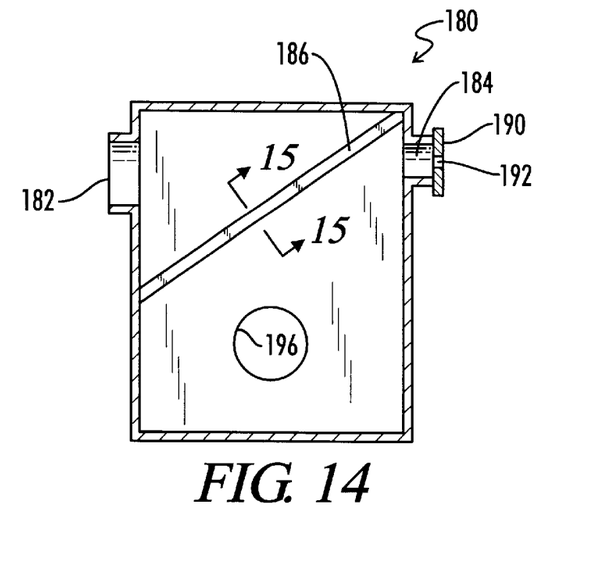
FIG. 14 is an elevation sectioned schematic view of an alternative design for the transition box of FIG. 5.
Figure 15:
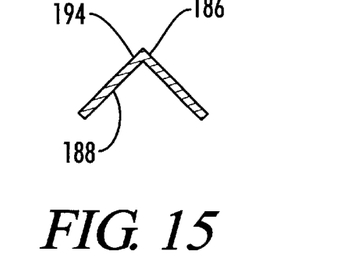
FIG. 15 is a cross-section view taken along line 15—15 of FIG. 14.

An alternative design of transition chamber is shown in FIG. 14 and is generally designated by the numeral 180. The transition chamber 180 is a box shaped structure having an air inlet 182 and a gas inlet 184 which are connected to the air supply duct 34 and gas line 36, respectively. A gas diffusing channel 186 is provided for aiding in the mixing of the incoming gas stream with the incoming air stream. As best seen in FIG. 15, the gas diffusing channel 186 has an open side 188 which faces the gas inlet 184.

An orifice plate 190 is located at the gas inlet 184 and has an orifice 192 defined therethrough through which the incoming gas stream must flow. The gas stream flowing through orifice 192 is directed to the open side 188 of gas diffusing channel 186. This will cause the incoming stream of gas to flow downward along channel 186. The incoming air stream from inlet 182 impinges upon and flows around a backside 194 of channel 186. As the air flows around the backside 194 of channel 186 the two portions of the air stream will come back together and cause a great deal of turbulence on the open side 188 if channel 186. This causes the incoming air stream from inlet 182 to be thoroughly mixed with the incoming gas stream through inlet 184 prior to the time the mixed gases flow to the fuel/air outlet 196 from which they flow to the blower 30.

The blower 30 includes a sealed blower fan 52 driven by an electric motor 54. The fan 52 may be described as a gas containment fan and it is sealed to prevent sparks from motor 54 from being communicated with the combustible fuel/air mixture contained within the fan so as to prevent premature ignition thereof.

The gas line 36 includes a control valve 56 disposed therein and a redundant safety valve or gas shut off valve 58 in series with the control valve 56. The gas line 36 will in turn be connected to a conventional fuel gas supply (not shown) such as a municipal gas line, with appropriate pressure regulators and the like being utilized to control the pressure of the gas supplied to the control valve 56.

The safety valve 58 is operated electrically by control from the ignition module 94 which is further described below.

As is further described below, the gas control valve 56 is preferably a ratio gas valve for providing fuel gas to the transition chamber 32 at a variable gas rate which is proportional to the flow rate exiting the blower 30, in order to maintain a predetermined air to fuel ratio over the flow rate range in which the blower 30 operates. One example of such a ratio gas valve is that sold by Landis & Staefa, Inc. as its Model SKP50 U Air/Gas Ratio Controlling Actuator.

Figure 6:
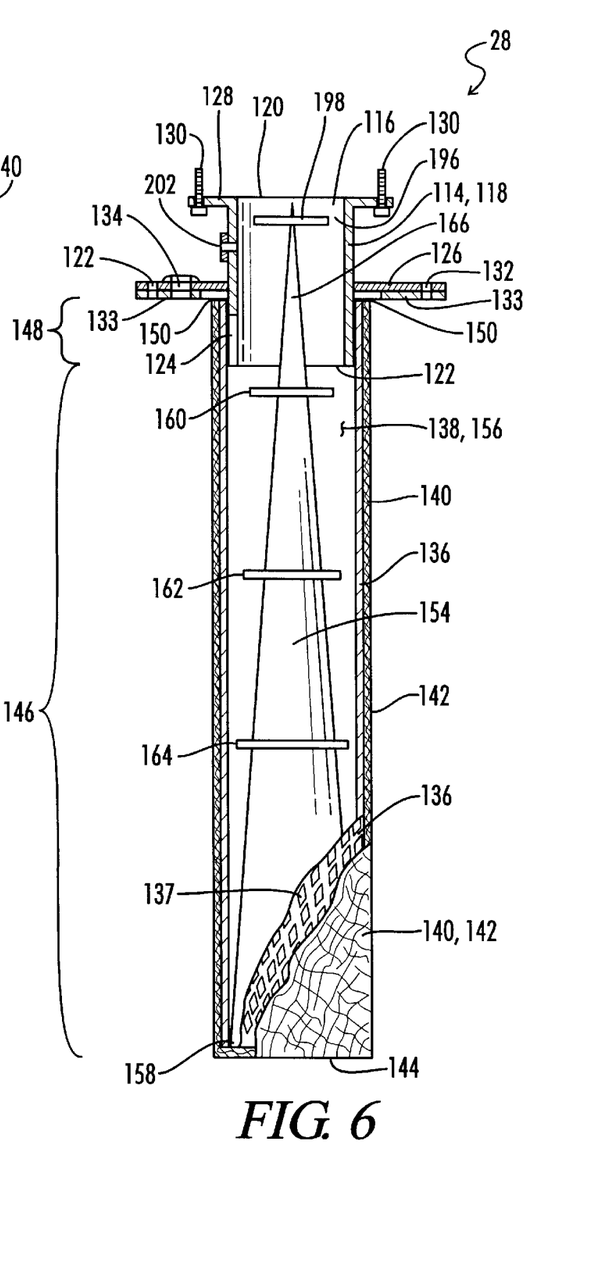
FIG. 6 is an elevation sectioned view of the burner utilized in the system of FIG. 1.

The gas control valve 56 is designed to equalize two differential pressures within the system. There are four pressure taps connected to the gas control valve. The first pair of pressure taps senses a differential pressure through an annular space 196 defined about an annular metering plate 198 of the burner 28 as shown in FIG. 6. A first pressure tap 200 (see FIG. 3) is located at the exit from blower 30, and a second pressure tap 202 (see FIG. 6) is located in the neck portion 118 of the burner 28. With the two pressure taps 200 and 202, the gas control valve 56 senses the pressure differential across plate 198 which corresponds to the flow rate of mixed gases exiting the blower 30 and entering the burner 28.

The location of the other two pressure taps which correspond to the gas flow rate entering the junction box or transition box 32, are provided by an upstream gas tap 204 and a downstream gas tap 206 on either side of the gas metering plate 190.

The particular gas control valve 56 utilized in one embodiment of the present invention is constructed so that there will be a one to one relationship between the sensed gas differential across pressure taps 200 and 202 corresponding to the flow rate of the gas and air mixture from blower 30, with the controlled pressure differential across taps 204 and 206 which corresponds to the incoming flow rate of gas.

In one particular embodiment of the invention, the burner 28 and its annular metering plate 198 are designed to provide differential pressure across taps 200 and 202 of 3½" of water at the maximum flow rate of the blower 30. The orifice plate 190 is selected to provide an equivalent 3½" of water differential pressure across taps 204 and 206 at a gas flow rate which is desired to correspond to the maximum flow rate of the blower 30. Thus, if the speed of blower 30 is reduced, and a lesser differential pressure is sensed at the burner 28, the control valve 56 will restrict flow through gas supply line 36 to reduce the pressure differential across taps 204 and 206 to an equivalent pressure differential.

It is noted that the design of the apparatus 10 of the present invention, in which the air and gas are mixed together before they are directed to the blower 30, allows the apparatus 10 to operate with a much lower gas supply pressure than do other competitive systems. As noted in the example just given, the system can be constructed to operate at a pressure differential of 3½" of water at the gas supply orifice plate 190. Thus, using that system, the present invention can be specified to customers as being operable when the city gas pressure is supplied at a minimum of 4" of water. This can be accomplished because the pressure of the subsequently mixed gas and air can be boosted by the blower 30. This is contrasted to many competitive systems, such as for example that of Stuart U.S. Pat. No. 5,881,681 which requires a gas supply pressure of as much as 8" of water. Other competitive systems quite often require minimum gas supply pressures of at least 4½" to 5" of water.

Thus, the present invention provides a system which can reliably operate at much lower minimum city gas supply pressures. This is a great advantage to consumers in many cities where gas supply pressures are relatively low, particularly during winter months of peak gas usage.

The water heater apparatus 10 may include a recirculation conduit 60 connected to the water conduit 12 at location 62 downstream of the primary heat exchanger 18 and at location 64 upstream of the primary heat exchanger 18.

Figure 2:
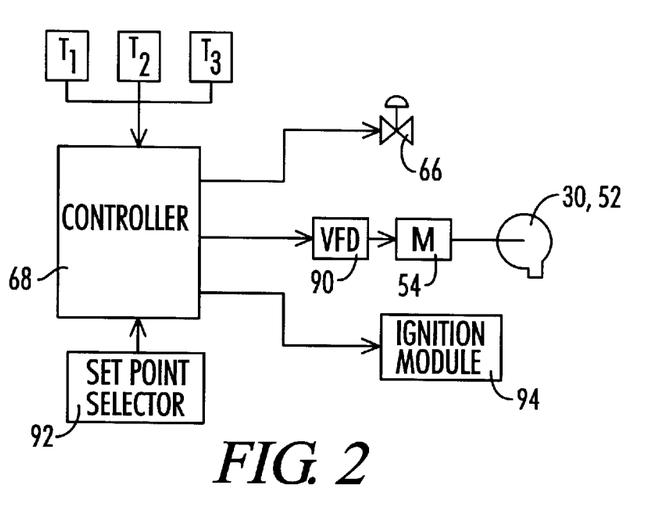
FIG. 2 is a schematic illustration of the control system for the water heater system of FIG. 1.

A recirculation valve 66 is disposed in the recirculation conduit 60. A controller 68 (see FIG. 2) is operatively associated with the recirculation valve for varying a position of the recirculation valve 66 to either allow or prevent flow of water back through the recirculation conduit 60, and to control the rate of such recirculation. The recirculation valve 66 is preferably of the type referred to as a floating valve which can be incrementally moved in either direction between its open and closed positions and may, for example, be a Model VF5225UH1LN manufactured by Honeywell, Inc. of Golden Valley, Minn.

A temperature sensor $T_3$ is located adjacent the water side inlet 19 is provided for sensing water temperature entering the primary heat exchanger 18. The controller 68 is operatively associated with the water temperature sensor $T_3$ and with the recirculation valve 66 for varying a position of the recirculation valve 66 in response to the temperature sensor $T_3$ to maintain the temperature of water entering the primary heat exchanger 18 above a pre-determined value to prevent condensation of combustion products in the primary heat exchanger 18.

As will be appreciated by those skilled in the art, the burner 28 will create a stream of combustion products including moisture. The moisture will condense if it contacts a sufficiently cool surface. It is desired to prevent condensation of that moisture on the fin tubes 26 of the primary heat exchanger 18, and this can be accomplished by maintaining the temperature of water entering the inlet 19 of primary heat exchanger 18 above approximately 130° F. In one embodiment of the invention this is accomplished by monitoring of the inlet temperature $T_3$ and adjusting the position of the recirculation valve 66 if the temperature $T_3$ is more than plus or minus 5° difference from the desired nominal minimum temperature of 130° F. When the bypass or recirculating valve 66 is open, only a portion of the water exiting the primary heat exchanger recirculates to the inlet of the primary heat exchanger. For example, in one embodiment of the invention designed for a flow rate of 90 GPM of water through the primary heat exchanger 18, with the valve 66 fully open, there will be 23 GPM flowing to outlet 16, while maintaining at least 90 GPM through the primary heat exchanger.

A main water pump 70 is disposed in the water conduit 12 immediately upstream of the primary heat exchanger 18.

The water heater apparatus 10 may further include a secondary heat exchanger 72 having a water side 74 which forms a portion of water conduit 12 so that the water flows therethrough and can be pre-heated by recovering additional heat energy from combustion gases flowing through the shell side 76 of secondary heat exchanger 72. Combustion gas from the burner 28 exiting the primary heat exchanger 18 flows through a combustion gas flow path 78 to a shell side inlet 80 of the secondary heat exchanger 72. The stream of combustion products from the burner 28 then exits the secondary heat exchanger as exhaust gas 82.

The secondary heat exchanger 72 is constructed as a condensing heat exchanger. That is, moisture contained in the combustion gas flow path 78 is allowed to condense on the exterior of the fin tubes 84 utilized in the secondary heat exchanger 72. In order to minimize corrosion of the exterior of the fin tubes 84 of secondary heat exchanger 72, those components are preferably coated with a corrosion resistant material such as that sold under the trademark HERESITE®, available from Heresite Protective Coatings, Inc. of Manitowoc, Wis.

As is best seen in the schematic illustration of FIG. 3, the secondary heat exchanger 72 includes a plurality of fin tubes 84 which are connected to a heat exchanger inlet 86 and a heat exchanger outlet 88. Secondary heat exchanger 72 is a single pass counterflow exchanger. Water flowing in inlet 86 passes once through the fin tubes 84 to the outlet 88 and is pre-heated by the combustion gases flowing through the shell side 76 in a generally downward direction as indicated by arrows 77.

With this arrangement, the water inlet temperature to the secondary heat exchanger 72 may be as low as 75° to 80° F., and the inlet temperature to the primary heat exchanger 18 can be maintained at least 130° F. while providing the design output of the heat exchanger apparatus.

The condensation products which will form in the shell side 76 of secondary heat exchanger 72 are typically rather acidic in nature having a pH in the range of 4 to 5. Those condensation products are preferably carried by drain 96 to a neutralization system 98 which includes a holding tank 100 within which is contained a bed of neutralizing material 102. The neutralizing material may for example be calcium carbonate, i.e., limestone. After residing in the holding tank 100 for a suitable time, the condensation products exit through drain 104 to a city sewer system or other suitable disposal location. They condensate leaving through drain 104 will have a neutral pH of approximately 7.

The use of the recirculation line 60 with recirculation valve 66 and/or the secondary heat exchanger 72 are optional. The variable flow blower 30 can be utilized without those features. Also, the recirculation line 60 and recirculation valve 66 alone could be utilized in connection with a prior art system like that of Vallett et al., U.S. Pat. No. 4,793,800 to aid in preventing condensation within the primary heat exchanger, without the use of the variable heat output burner of the present invention.

The Controller

The controller 68 preferably is a Honeywell Excel 10 controller available from Honeywell, Inc. of Golden Valley, Minn.

The controller 68 senses temperature of the water in the water conduit 12 at one or more locations including inlet temperature sensor $T_1$, outlet temperature sensor $T_2$, and recirculation temperature sensor $T_3$.

A set point selection system 92 is provided in association with the controller 68 whereby an operator may input to the controller 68 the desired water temperature which is desired to be seen at location $T_1$ or $T_2$.

The controller 68 will then control a number of aspects of the system 10 in order to achieve this desired temperature control. One function of the controller 68 is to control the flow rate of the blower 30. As previously noted, the blower 30 includes a fan 52 which is driven by an electric motor 50. Preferably, the electric motor is controlled by a variable frequency drive 90, which is in turn controlled by the controller 68. The variable frequency drive may for example be a Model SP200A available from Reliance/Rockwell Automation of Cleveland, Ohio. As will be understood by those skilled in the art, the variable frequency drive 90 varies the speed of the electric motor 54 and thus, the output of the blower fan 52 by varying a frequency of an electrical power signal provided to the electric motor 54. The variable frequency drive 90 converts the power supply voltage from 120 volts to 230 volts and then varies the frequency of the 230 volts signal provided to the electric motor 54 in order to alter the speed of the electric motor 54 and thus of the blower 30.

Preferably the controller 68 and associated control components are selected so as to provide a blower turn down ratio of at least two to one, and preferably at least four to one. For example, with a blower turn down ratio of two to one, the blower 30 would be operated within a range from 50% of maximum output to 100% of maximum output. This provides a corresponding burner range of 50% to 100% of maximum burner output. For a turn down ratio of four to one, the blower 30 would be operated in a range of from 25% of maximum to 100% of maximum output. Again, this variation in output is controlled by varying the frequency of the electrical signal sent by variable frequency drive 90 to the electric motor 54 which, in turn drives the blower fan 52.

The blower flow rate is continuously variable within the defined flow rate range. It will be understood that the term continuously variable is used in contrast to a staged burner system like that for example of the Lochinvar Copper-Fin II® system described above. These continuously variable systems may in fact be variable in very small increments related to the digital nature of the control system, but for all practical purposes, the flow rate is continuously variable between its upper and lower limits.

A second primary function of controller 68 is to control the position of recirculation valve 66 as previously described.

The controller 68 also operates in conjunction with an ignition module 94 which controls an electric igniter 135 associated with burner 28. The ignition module 94 may, for example, be a Model 2467H 900 (or 901)-133 available from Kidde-Fenwal.

The controller 68 also monitors a flow switch 208 at the outlet 21 of heat exchanger 18 to ensure that there is flow through the primary heat exchanger 18. If the water flow through the heat exchanger stops, it is important that the burner 28 be shut down immediately to avoid overheating of the heat exchanger 18.

Physical Arrangement

FIG. 3 illustrates more realistically the actual physical arrangement of the components of water heater apparatus 10. The apparatus 10 includes a primary heat exchanger cabinet 104 within which the primary heat exchanger 18 is contained. Located above the primary heat exchanger cabinet 104 is an upper cabinet 106 which houses the blower 30, transition box 32, air and gas conduits 34 and 36, and the controller 68 and other associated control components.

Mounted on a back side 108 of primary cabinet 104 is a secondary heat exchanger cabinet 110. An opening 112 in the back side 108 communicates the interior of primary heat exchanger cabinet 104 with the interior of secondary heat exchanger cabinet 110 thus, defining the combustion flow path 78 which allows combustion gas from the burner 28 which has flowed past the primary heat exchanger 18 to flow into the shell side 76 of secondary heat exchanger 72. There it can flow down past the fin tubes 84 of the secondary heat exchanger 72 as indicated by arrows 77 to impart additional heat to the water entering water inlet 86.

The Burner Assembly

Referring now to FIGS. 6–11, the details of construction of the burner 28 are shown. The burner apparatus 28 includes a mounting head 114 which is shown in plan and elevation views in FIGS. 7 and 8. The mounting head 114 has a fuel inlet opening 116 defined therein for receiving combustion air and fuel gas therethrough from the blower 30. The mounting head 114 has a tubular neck 118 through which the fuel inlet opening 116 is defined. The neck has a proximal end 120 and a distal end 122.

Figure 8:
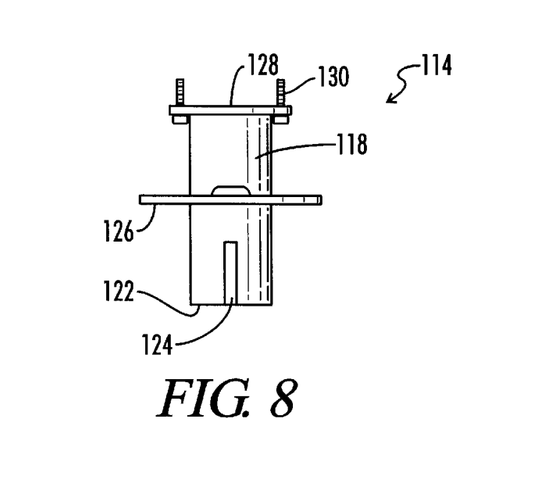
FIG. 8 is an elevation view of the mounting heat of the burner of FIGS. 6 and 7, showing an ignition cutout slot therein.

The tubular neck 118 has a longitudinal slot or radial opening 124 defined therein which is best seen in the elevation view of FIG. 8. The slot extends radially through the neck 118 and extends downward to the distal end 122 of the neck 118.

Figure 7:
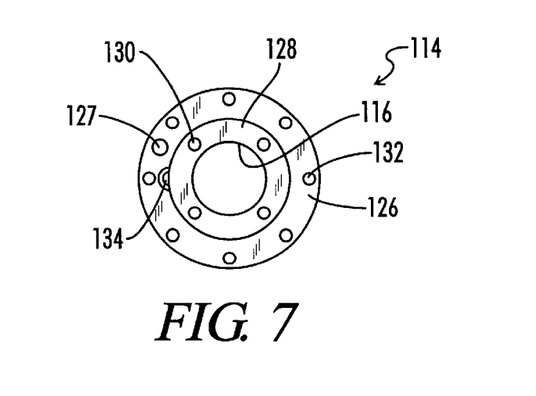
FIG. 7 is a plan view of mounting head of the burner of FIG. 6.

The mounting head 114 includes a mounting flange 126 extending radially outward from the tubular neck 118 for mounting the burner 28 in the primary heat exchanger 18.

The burner 28 further includes a gasket 133 located immediately below the flange 126. The gasket 133 is sandwiched between the flange 126 and the heat exchanger 18 and is directly exposed to flame from the burner 28. The gasket 133 is preferably constructed from an alumina silica vacuum formed material similar to that utilized for the exterior tiles on the space shuttle. This material is capable of being exposed directly to the flame and will insulate and shield the mounting flange 126 from the flame. The gasket 133 is preferably mounted between the flange 126 and a complementary flange of the heat exchanger 18 with a series of bolts extending through holes in the gasket 133, and utilizing bushings (not shown) in the bolt holes of the gasket 133 which are of a length slightly less than the thickness of the gasket 133. The bushings control the allowable compression of the gasket 133 when the same is bolted in place between the flanges of the mounting head 114 and the heat exchanger 18.

The mounting head 114 further includes an upper flange 128 which is used to mount the blower 30 on top of the mounting head 118. It is noted that if necessary, an adapter (not shown) may be mounted upon the upper flange 128 to aid in mounting of the blower 30. A plurality of studs 130 extend upward from the upper flange 128 for mounting of the blower 30 or the adapter (not shown) for the blower 30.

The mounting flange 126 includes a plurality of perimeter bolt holes 132 defined therein for bolting the same to the primary heat exchanger 18.

A mounting hole 134 is defined in the mounting flange 126 for receiving the igniter 135 (see FIG. 1) which extends downward adjacent the longitudinal slot 124. The igniter 135 may be a Model Y271 Hot Surface Igniter available from Norton Igniter Company.

Also disposed in mounting flange 126 is a view port 127, seen in FIG. 7, which allows the flame from burner 28 to be visually observed.

The burner apparatus 28 further includes a cylindrically shaped inner support structure 136 which is preferably formed of expanded metal which is preferably a stainless steel material. The support structure 136 defines an interior zone 138 which is communicated with the fuel inlet opening 116 of the mounting head 114.

The inner support structure 136 is preferably constructed of expanded metal. This provides a support structure capable of withstanding varying operating temperatures without inducing stress cracking therein. Expanded metal is a form of material well known to the art, in which a sheet of metal has slits formed therein and the metal is then stretched laterally to expand it into a sheet having substantially diamond shaped openings 137 therein. Expanded metal has an inherent flexibility due through the nature of its construction, and can withstand substantial expansion and contraction due to heating and cooling without inducing stress cracking within the metal which forms the expanded metal sheet.

The burner apparatus 28 further includes an exterior layer 140 of flexible woven heat resistant material or fabric received about the inner support structure 136 and defining an exterior flame attachment surface 142. This layer 140 may also be referred to as a flame support screen 140.

The exterior layer 140 is preferably constructed of a material such as the NIT 100S Metal Fibre Burner products available from Acotech Corp. of Marietta, Ga. These materials comprise a woven fabric of metal fibers having a thickness of approximately ⅛ inches. This layer of metal fibers is sufficiently thick and sufficiently tightly woven so as to eliminate direct radially open paths therethrough such as are present in prior art burner structures like that of Vallett et al. U.S. Pat. No. 4,793,800 and to instead provide a matrix of random radially indirect flow paths for fuel gas and combustion air therethrough. Such a woven fabric provides an exterior layer 140 which is sufficiently flexible to avoid stress cracking thereof when subjected to reduced rate operations of the burner 28 wherein the point of attachment of the flames to the burner 28 extends downward into the woven flame resistant material.

As will be understood by those skilled in the art, prior art burners such as that of Vallett et al., U.S. Pat. No. 4,793,800 were designed to operate in a very narrow range of combustion air and fuel gas flow rates wherein the velocity of gases flowing outward through the burner is equal to or slightly in excess the flame propagation velocities at which a flame could otherwise propagate upstream. This causes the flames to actually stand off a slight distance from the surface of the burner. With such prior art systems, if the velocity of gases flowing through the burner falls below the design level, the leading edge of the flame will contact or be close to the surface of the burner, thus resulting in conduction of excessive heat to the surface of the burner. This can lead to substantial stress cracking of the burner due to the fact that the prior art burners are not designed for exposure to substantial variations in heat.

The exterior layer 140 of flexible woven heat resistant material is preferably formed in the shape of a tubular sock 140 having a proximal or upper open end through which the interior support structure 136 is received. The sock 140 has a closed distal lower end 144.

As seen in FIG. 6, the open upper proximal ends of both the interior support structure 136 and the exterior sock 140 are received about the distal end portion of the neck 118 of mounting head 114, so that a distal portion 146 of sock 140 extends distally beyond the distal end 122 of neck 118.

An upper or proximal portion 148 of the interior support structure 136 and sock 140 are received around a lower portion of neck 118 and there is an annular crush weld of both the inner support structure 136 and the exterior sock 140 to the neck 118 at 150.

Thus, it is seen that the interior support structure 136 and exterior sock 140 both extend above the longitudinal slot 124. The longitudinal slot 124 can be described as being communicated with the distal portion 146 of the tubular sock 140.

As illustrated in FIG. 1, the apparatus 10 includes the igniter 135 which is located outside the neck 118 adjacent the longitudinal slot 124 so that fuel gas and combustion air flowing into the tubular sock 140 can be ignited through the slot 124 while the igniter 135 remains outside of a combustion zone surrounding the distal portion 146 of tubular sock 140.

As is best seen in FIG. 1, the igniter 135 is attached to and supported from the mounting flange 126 and extends through the mounting flange 126 with a lower ignition portion of the igniter extending below the flange 126 and with an upper power supply portion of the igniter 135 extending above the mounting flange 126 and connected to ignition module 94 by electrical connection 152.

Prior art systems like that of Vallett et al., U.S. Pat. No. 4,793,800 located their igniter adjacent the upper portion of the perforated screen so the igniter was actually within the combustion zone and, thus, was more likely to overheat than is the igniter arrangement of the present invention which utilizes the radial slot 124 to allow the igniter to be placed above the combustion zone with its electrical connections extending through and protected by the mounting plate 126 and gasket 133.

A conically shaped flow directing core 154 is received within the interior zone 138 of the inner support structure 136 and the upper portion thereof is spaced radially inward from the inner support structure 136 to define an annular flow path 156 of distally decreasing cross section.

Figure 12:
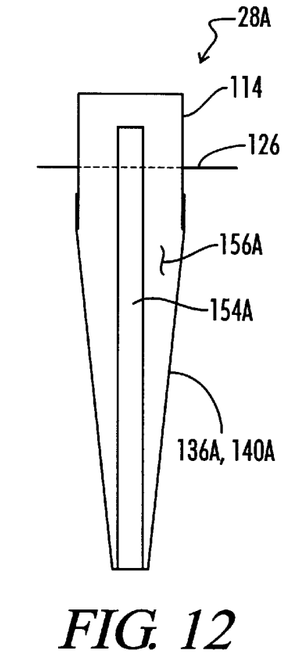
FIG. 12 is a schematic illustration of an alternative construction for the burner of FIG. 6.

FIG. 12 illustrates an alternative embodiment of the burner 28 which has been designated as 28A. The alternative burner 28A includes a cylindrical flow directing core 154A and includes a distally tapered outer sock and support structure 136A and 140A which together define an annular flow path 156A of distally decreasing cross section.

In the preferred embodiment of FIG. 6, the interior support structure 136 and the exterior sock 140 are crush welded to the lower annular edge 158 of the core 154.

There are a plurality of flow resisting permeable discs or baffles 160, 162 and 164 disposed in the annular flow path 156 for balancing pressure along the length of the burner 28. Each of the discs 160, 162 and 164 are shown in plan view in FIGS. 9, 10 and 11, respectively. The perforated discs are brazed to the conical core 154. The core 154 is preferably constructed of mild steel material.

As seen in FIG. 6, the first or uppermost disc 160 is located closest to a proximal end 166 of the core 154, and the second disc 162 is located distally from the first disc 160, and the third disc 164 is located distally from the second disc 162.

The first disc 160 is located distally of the slot 124 and the igniter 135 for the purpose of increasing back pressure of the downwardly flowing combustion air and fuel gas mixture within the burner 28 adjacent the slot 124 and the igniter 135 to ensure that the mixture of combustion air and fuel gas flow outward through the slot 124 to be exposed to the igniter 135. In the absence of the disc 160, it is possible, dependant upon the flow rate of the combustion air and fuel gas mixture, that there could be a venturi effect which would draw air radially inward through slot 124, and thus, would not allow the igniter 135 to ignite the fuel gas and combustion air mixture. It will be appreciated, because the slot 124 is in communication with the distal portion 146 of sock 140, that when the combustion air and fuel gas mixture flowing radially outward through slot 124 is ignited, the flame will immediately travel downward along the length of the distal portion 146 of sock 140.

Figure 13:
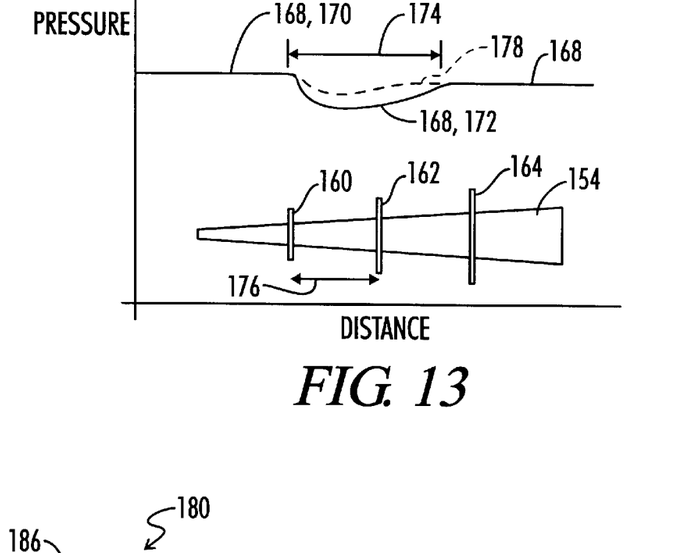
FIG. 13 is a graphical representation of air and gas pressure at various locations in the burner.

FIG. 13 is a schematic illustration of the pressure of the combustion air and fuel gas mixture within the annular space 156 along the length of the burner 28. The conical shaped interior core 154 is schematically illustrated as are the locations of the first, second and third discs 160, 162 and 164. The vertical axis of FIG. 13 represents pressure and the horizontal axis represents distance.

A pressure curve 168 shown in solid lines represents the pressure within the annular space 156 in the presence of only the first disc 160. It is seen that upstream of first disc 160 the pressure is at a level 170, and immediately downstream of the first disc 160, the pressure drops and then recovers along a portion of the pressure curve 168 which may be referred to as a recovery curve 172.

The purpose of the second disc 162 and its positioning is to minimize the effect of the recovery curve 172 so that there is less pressure drop immediately downstream of first disc 160. The upper restrictor disc also functions to ensure that flame exits the slot 124 throughout the operation of the burner apparatus, which allows the igniter 135 to also be used as a flame sensor.

The recovery curve 172 which would exist downstream of first disc 160 in the absence of disc 162 can be described as having a length 174. The second disc 162 is placed at a distance 176 from the first disc 160 which is less than the length 174 of pressure recovery curve 172. This positioning of the second disc 162 in turn, effects the actual pressure recovery curve so that it follows the dashed line 178 rather than the solid line 172.

Similarly, the third disc 164 will be placed downstream from second disc 162 a distance less than the length of the pressure recovery curve which would exist downstream of second disc 162 in the absence of third disc 164.

The number of perforated restrictor plates utilized is related to the overall length of the burner, and depending upon the length of the burner, fewer than three or more than three plates might be used.

One resulting desirable effect from the use of the multiple discs 160, 162 and 164 is that they will result in a burner flame pattern having peaks adjacent the upstream sides of each disc thereby reducing harmonic resonances within the flame pattern and providing a relatively quiet operating burner. As will be understood by those skilled in the art, many burner designs allow resonance patterns to be formed within the flame pattern, which can cause a great deal of noise to be emitted from the burner.

Figure 9:
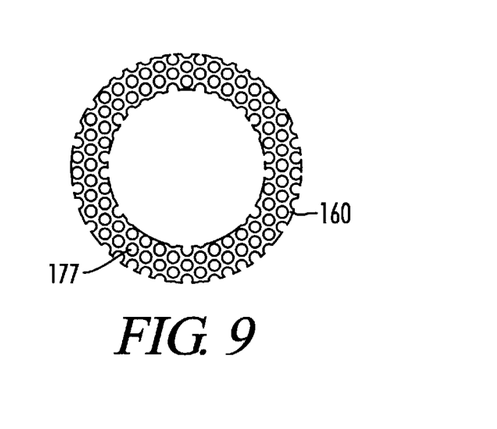
FIG. 9 is a plan view of an upper perforated baffle of the burner.
Figure 10:
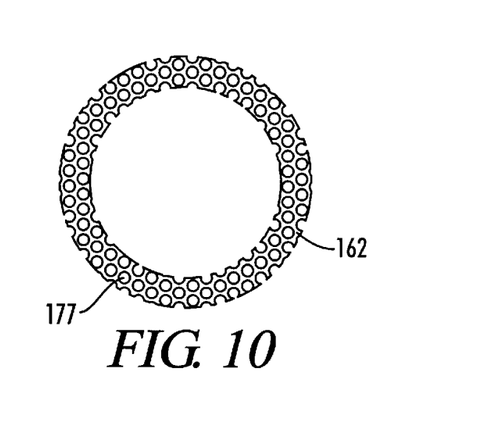
FIG. 10 is a plan view of an intermediate perforated baffle of the burner.
Figure 11:
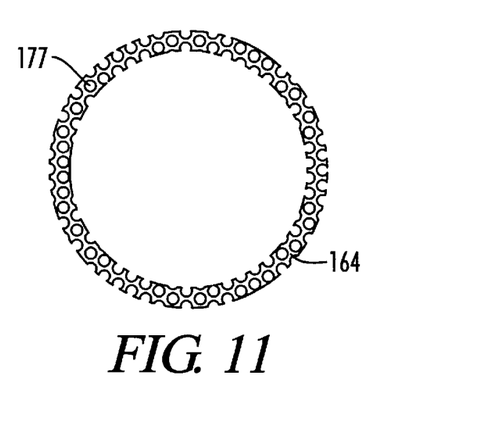
FIG. 11 is a plan view of a lower perforated baffle of the burner.

As is apparent in FIGS. 9, 10 and 11, each of the discs 160, 162 and 164 is constructed from a metal plate having a uniform pattern of uniformly sized perforations such as 177 distributed across the disc.

The discs 160, 162 and 164 may be described as foraminous back pressure plates. The uppermost disc 160 may be described as a foraminous back pressure plate located in the interior zone 138 distal of the igniter 135 for increasing pressure of fuel gas and combustion air adjacent the radial opening 124 to ensure outflow of fuel gas and combustion air through the radial opening 124 to the igniter 135.

One additional safety feature which can be added to the burner 28 is a fusible link 210 (see FIG. 1) which is preferably located in the uppermost portion of the burner 28. The fusible link is a heat activated fuse placed in an electrical circuit connected to any one of the safety switches associated with the apparatus 10. The fusible link includes an electrically conductive material which will melt when exposed to direct flames, thus breaking power to one of the safety switches which will in turn break the power supply to the apparatus 10 causing the heater to shut down. This will prevent overheating of the apparatus 10 in the event of malfunction of the burner allowing flashback of flame.

Methods of Operation

In a typical start up of the water heater apparatus 10, the following sequence of operations is provided:

1. 120 Volt AC power is supplied to the internal pump 70.
2. 120 Volt AC power is supplied to a control circuit transformer, ignition module 94 and the variable frequency drive 90.
3. The internal pump 70 starts operation which is proven by a flow switch 208 (see FIG. 4) monitored by controller 68.
4. 24 Volt AC power is then supplied to all low voltage controls through a series of safety limit switches.
5. The set point selector 92 of the controller 68 is set to "call for heat".
6. The controller 68 initiates start up sequence by checking the various temperature sensors $T_1$, $T_2$ and $T_3$ and input signals from various safety controls.
7. The controller 68 then enables the ignition module 94.
8. The ignition module 94 checks for open low air switch contacts and enables the variable frequency drive 90.
9. The controller 68 drives the variable frequency drive 90 to operate the blower 30 at 100% of maximum output, for pre-purge, then adjusts to soft start mode (e.g. 50% of maximum design.)

10. A low pressure air switch proves to enable the ignition module 94.
11. The ignition module 94 initiates heat up of the hot surface igniter 135.
12. The hot surface igniter 135 proves minimum current flow.
13. The ignition module 94 controls 120 Volt AC current to the variable ratio gas valve 56 and 24 Volt AC to the redundant valve 58.
14. Relay contacts prove operation of the igniter 135, gas valves 56 and 58, and various other safety features to the controller 68.
15. The variable ratio gas valve 56 senses pressure from the combustion air blower 30 and supplies gas to the mixing chamber 32 and thus, into the blower 30.
16. The combustion air and fuel gas mixture is forced by the blower 30 into the burner 28 and out of openings through the outer mesh surface 140 of burner 28.
17. The igniter 135 lights the fuel gas and combustion air mixture which is flowing outward through the slot 124, and then the igniter 135 serves as a flame sensor to prove main burner flame to the ignition module 94.
18. The burner 28 is now in a soft start mode operating at 50% of its maximum design flow rate.
19. The controller 68 then signals the variable frequency drive 90 to adjust the speed of blower 30 based on the desired temperature which has been input at the set point selector 92.
20. The ratio gas valve 56 then adjusts the input of fuel gas to the burner 28 based upon the output of the blower 30.
21. The burner 28 fires at a rate required to satisfy the temperature set point which has been programmed into the controller 68 by set point selector 92.
22. The controller 68 senses inlet water temperature $T_3$ to the primary heat exchanger 18 and provides a corresponding signal to the bypass valve 66 to adjust the position of the bypass valve 66 as necessary.
23. The position of the bypass valve 66 is thus automatically adjusted to maintain an inlet water temperature $T_3$ to the primary heat exchanger 18 above the dew point of flue gas products created by the burner 28, thus preventing condensation of flue gas products in the primary heat exchanger 18.
24. The products of combustion from the burner 28 pass over the primary heat exchanger 18.
25. Those products of combustion then flow through the combustion gas path 78 and pass over the secondary heat exchanger 72.
26. As the output of blower 30 is varied, the ratio gas valve 56 adjusts the flow rate of gas input to the mixing chamber 32 and thus to the blower 30 and burner 28 based upon the output of the blower 30.

The methods of using the water heater apparatus 10 can be more generally described as including the steps of providing a burner 28 having an operative range of energy output rates varying from an upper limit to a lower limit; mixing combustion air and fuel gas to create an air and fuel mixture; receiving the air and fuel mixture in an inlet 50 of a variable output blower 30 and delivering the air and fuel mixture from the blower 30 to the burner 28; heating a stream of water flowing through the water side 20 of primary heat exchanger 18 with heat input transmitted from the burner 28 to the heat exchanger 18; monitoring a parameter of the water heating system such as the inlet temperature $T_1$ or outlet temperature $T_2$; and varying the output of blower 30 in response to the monitored temperature and thereby varying the energy rate output of the burner 28 and the heat input into the stream of water flowing through the water side 20 of primary heat exchanger 18.

Utilizing this method, it is preferable upon start up of the burner 28 to limit the output of the blower 30 to a selected fraction of a maximum output of the blower, such as for example, the 50% soft start described above, so that the burner 28 starts up at a selected reduced energy rate output less than its upper limit. Then, after start up of the burner 28, the burner 28 is operated at the selected reduced energy output for an interval, such as for example, a few seconds. Then the blower output 30 is increased or decreased until the burner 28 is operating at a desired level corresponding to the pre-selected set temperature, which desired level may be at the upper limit of its energy output rate. Subsequently, fuel gas flow is controlled in response to the output rate of the blower 30 thereby maintaining a constant air to fuel ratio received by the blower 30.

During continued operation of the water heater apparatus, the water temperature is monitored at either the inlet T1 or outlet T2, and in response to that monitored temperature, the speed of the electric motor 54 driving the blower 30 is varied by varying a frequency of the electrical power signal provided thereto by means of the variable frequency drive 90.

During the operation of the water heater apparatus 10, the fuel and air mixture in the blower 30 is isolated from the electric drive motor 54 by seals located in the blower 30.

During the operation of the water heater apparatus 10, condensation of combustion products from the burner within the primary heat exchanger 18 is prevented by recirculating water exiting the heat exchanger 18 back through the recirculation line 60 until the temperature of the water $T_3$ entering the heat exchanger 18 exceeds a pre-determined minimum inlet temperature, such as for example, 130° F.

Preferably, the water flowing to the primary heat exchanger 18 is pre-heated by flowing the same through the secondary heat exchanger 72 which is located upstream of the primary heat exchanger 18. After combustion products from the burner 28 have passed the first heat exchanger 18, those combustion products flow past the secondary heat exchanger 72 so that additional heat energy may be extracted therefrom.

The operation of the burner 28 may be described as generally including the steps of providing a burner 28 including a layer 140 of heat resistant material through which fuel gas and combustion air must flow; varying a flow rate of fuel gas and combustion air to the burner 28 in response to a varying heat demand upon the water heater apparatus 10; allowing a flame attachment point of flames from the burner 28 to attach to and migrate into the layer 140 of heat resistant material when the flow rate is reduced below a maximum flow rate; and avoiding stress cracking of the burner 28 by allowing the layer 140 of heat resistant material to flex when subjected to varying temperatures.

By providing the layer 140 of heat resistant material with a sufficient thickness and sufficiently tight weave to eliminate radially direct openings therethrough and to provide a matrix of random radially indirect openings therethrough, the flames from the burner 28 can be prevented from flashing back through the layer 140 of heat resistant material.

Although the temperature of the exterior of the outer layer 140 can be in the range of 1600° to 1800° F., the temperature on the inside of the outer layer 140 will be on the order of 200° F., and the temperature in the interior zone 138 will be substantially ambient temperature at which the combustion air and fuel gas are being supplied.

This provides a self cleaning burner 28 which allows the flames to attach to the exterior surface 142 thereof to thereby burn away contaminants on the exterior surface 142.

The burner 28 is initiated by providing an igniter 135 outside of the heat resistant material 140 and adjacent a proximal end of the heat resistant material. Back pressure within the interior zone 138 adjacent the igniter 135 may be raised by providing the first foraminous flow restrictor 160 within the interior space 138 of burner 28 distal of the igniter 135.

The flow of fuel gas and combustion air through the exterior layer 140 of heat resistant material is balanced along the length of the burner 28 by providing at least one additional foraminous flow restrictor such as 162 distal of the first flow restrictor 160.

A noise level of the burner 28 is reduced by eliminating harmonic resonance therein by means of the flow restrictors 160, 162 and 164.

Thus, it is seen that the apparatus and methods of the present invention readily achieve the ends and advantages mentioned as well as those inherent therein. While certain preferred embodiments of the invention have been illustrated and described for purposes of the present disclosure, numerous changes in the arrangement and construction of parts and steps may be made by those skilled in the art, which changes are encompassed within the scope and spirit of the present invention as defined by the appended claims.

What is claimed is:

1. A water heater apparatus, comprising
    a burner including:
        a mounting head having a fuel inlet opening defined in the head for receiving combustion air and fuel gas through the opening;
        an inner support structure attached to the head, the inner support structure defining an interior zone communicated with the fuel inlet opening of the head; and
        an exterior layer of flexible woven heat resistant material received about the inner support structure and defining an exterior flame attachment surface;
    a variable rate fuel supply system for supplying pre-mixed combustion air and fuel gas to the burner at a variable flow rate within a flow rate range; and
    a heat exchanger, operably associated with the burner so that heat energy from the burner is transferred to water flowing through the heat exchanger, the heat transfer occurring at varying rates dependent upon the flow rate at which combustion air and fuel gas are supplied to the burner.

2. The apparatus of claim 1, wherein:
    the exterior layer of flexible woven heat resistant material is formed in the shape of a tubular sock having an open end through which the interior support structure is received, and the sock having a closed distal end.

3. The apparatus of claim 1, wherein:
    the mounting head has a tubular neck through which the fuel inlet opening is defined, the neck having a distal end portion; and
    the exterior layer is received about and attached to the distal end portion of the neck of the burner mounting head, so that a distal portion of the exterior layer extends distally beyond the neck of the burner mounting head.

4. The apparatus of claim 3, wherein:
    the tubular neck of the burner mounting head has a longitudinal slot formed therethrough and extending to the distal end of the neck so that the slot is communicated with the distal portion of the exterior layer; and
    the apparatus further includes an igniter located outside the neck adjacent the slot so that fuel gas and combustion air flowing into the exterior layer can be ignited through the slot while the igniter remains outside of a combustion zone surrounding the distal portion of the exterior layer.

5. The apparatus of claim 4, wherein:
    the mounting head includes a mounting flange extending radially out from the tubular neck for mounting the burner in a heat exchanger; and
    the igniter is attached to and supported from the mounting flange and extends through the mounting flange with an ignition portion of the igniter extending distally from the flange and with a power supply portion of the igniter extending proximally from the mounting flange.

6. The apparatus of claim 1, further comprising:
    a flow directing core concentrically received within the interior zone of the inner support structure and spaced radially from the inner support structure to define an annular flow path of distally decreasing cross section.

7. The apparatus of claim 6, wherein:
    the inner support structure and the exterior layer are cylindrical; and
    the core is a proximally tapered cone.

8. The apparatus of claim 6, wherein:
    the interior support structure and the exterior layer are formed as distally tapered conical shapes; and
    the core is cylindrical.

9. The apparatus of claim 6, further comprising:
    a plurality of flow resisting permeable discs disposed in the annular flow path for balancing pressure along length of the burner.

10. The apparatus of claim 9, further comprising:
    an igniter supported by the mounting head for igniting fuel gas and combustion air outside of the exterior layer; and
    wherein the plurality of discs includes a first disc located closest to a proximal end of the core, and a second disc located distally from the first disc, the first disc being located distally of the igniter for increasing back pressure within the burner adjacent the igniter to ensure outflow of fuel gas and combustion air adjacent the igniter.

11. The apparatus of claim 10, wherein:
    the second disc is located within a distance from the first disc less than a length of a pressure recovery curve which would exist downstream of the first disc at design flow rates of the burner in the absence of the second disc.

12. The apparatus of claim 9, wherein:
    the plurality of flow resisting permeable discs create a burner flame pattern having peaks adjacent an upstream side of each disc thereby reducing harmonic resonances within the flame pattern and providing a quiet burner.

13. The apparatus of claim 9, wherein:
    each disc is constructed from a metal plate having a uniform pattern of uniformly sized perforations distributed across the disc.

14. The apparatus of claim 1, wherein the mounting head comprises:
    a tubular neck having an inner bore therethrough which defines the fuel inlet opening, the neck having a proximal end and a distal end; and
    the exterior layer of flexible woven heat resistant material being received about the distal end of the neck and attached to the neck.

15. The apparatus of claim 14, wherein:
the exterior layer is crush welded to the neck.
16. The apparatus of claim 14, wherein:
the neck has a radial opening defined in a distal portion thereof;
the exterior layer covers the radial opening; and
the apparatus includes an igniter supported from the mounting head exterior of the exterior layer and adjacent the radial opening.
17. The apparatus of claim 16, further comprising:
a foraminous back pressure plate located in the interior zone distal of the igniter for increasing pressure of fuel gas and combustion air adjacent the radial opening to ensure outflow of fuel gas and combustion air through the radial opening to the igniter.
18. The apparatus of claim 1, wherein:
the inner support structure is constructed of expanded metal thereby providing a support structure capable of withstanding varying operating temperatures without inducing stress cracking in the support structure.
19. The apparatus of claim 18, wherein:
the expanded metal of the inner support structure is stainless steel.
20. The apparatus of claim 1, wherein:
the exterior layer is sufficiently flexible to avoid stress cracking thereof when subjected to reduced rate operation wherein a burner flame attachment zone extends into the woven heat resistant material.
21. The apparatus of claim 1, wherein:
the exterior layer is sufficiently thick and is sufficiently tightly woven as to eliminate direct radially open paths therethrough, thus providing a matrix of random radially indirect flow paths for fuel gas and combustion air therethrough.
22. The apparatus of claim 1, wherein the mounting head comprises:
a tubular neck;
a mounting flange extending radially outward from the tubular neck for mounting the burner in a heat exchanger; and
an alumina silica vacuum formed gasket arranged to be sandwiched between the flange and the heat exchanger so that the gasket is directly exposed to flame from the burner to shield the mounting flange from the flame of the burner.
23. The apparatus of claim 1, wherein:
the heat exchanger includes a plurality of parallel straight fin tubes arranged in a cylindrical pattern;
the burner apparatus is concentrically received within the heat exchanger; and
the exterior layer of the burner apparatus is formed as a tubular sock, closed at a distal end thereof, so that flames project radially from the sock towards the fin tubes.
24. The apparatus of claim 1, further comprising:
a fusible switch, located in the burner apparatus, for shutting down the burner apparatus in the event of flashback of flames into the mounting head.
25. A burner apparatus, comprising:
a tubular neck having an inner bore defining a fuel inlet opening therethrough, the neck having a distal end and a proximal end, the neck having a radial opening defined therethrough;
a flame support screen attached to the distal end of the neck;
a permeable flow resistor located inside of the flame support screen and distally of the radial opening, for increasing back pressure within the burner adjacent the radial opening; and
an igniter located outside of the neck adjacent the radial opening so that the igniter is proximally spaced from a combustion zone surrounding the flame support screen.
26. The apparatus of claim 25, wherein:
the radial opening is a longitudinal slot extending to the distal end of the neck.
27. The apparatus of claim 25, further comprising:
a mounting flange extending radially from the neck, the flange having an igniter mounting opening defined therethrough; and
the igniter is received through the igniter mounting opening, and the igniter includes a power connection located proximally of the flange.
28. The apparatus of claim 27, further comprising:
a gasket located on a distal side of the flange for insulating the power connection from the heat of the burner.
29. The apparatus of claim 25, wherein:
the flame support screen is constructed of fire resistant fabric.
30. A method of providing a variable heat energy output from a burner to a water heater, comprising:
(a) providing a burner including a layer of heat resistant material through which fuel gas and combustion air must flow;
(b) varying a flow rate of fuel gas and combustion air to the burner in response to a varying heat demand upon the water heater;
(c) allowing a flame attachment point of flames from the burner to attach to and migrate into the layer of heat resistant material when the flow rate is reduced below a maximum flow rate;
(d) avoiding stress cracking of the burner by allowing the layer of heat resistant material to flex when subjected to varying temperatures;
(e) providing an igniter outside of the heat resistant material adjacent a proximal end of the heat resistant material; and
(f) raising back pressure interior of the layer of heat resistant material and adjacent the igniter by providing a first foraminous flow restrictor within the burner distal of the igniter.
31. The method of claim 30, wherein:
step (a) includes providing the layer of heat resistant material with a sufficient thickness and a sufficiently tight weave to eliminate radial direct openings therethrough and provide a matrix of random radially indirect openings therethrough;
step (c) includes, preventing the flames from flashing back through the layer of heat resistant material.
32. The method of claim 30, wherein:
step (c) includes, self-cleaning the burner by allowing the flames to attach to the exterior surface of the heat resistant material thereby burning way any contaminants on the exterior surface.
33. The method of claim 30, further comprising:
balancing flow of fuel gas and combustion air through the layer of heat resistant material along a length of the burner by providing at least one additional foraminous flow restrictor distal of the first foraminous flow restrictor.
34. The method of claim 30, further comprising:
reducing a noise level of the burner by eliminating harmonic resonance therein by means of the flow restrictors.

* * * * *